United States Patent
Park et al.

(10) Patent No.: US 9,637,611 B2
(45) Date of Patent: May 2, 2017

(54) 3D COVALENT MOLECULAR NETWORK NANOCAPSULE AND PREPARING METHOD THEREOF

(71) Applicant: GWANGJU INSTITUTE OF SCIENCE AND TECHNOLOGY, Gwangju (KR)

(72) Inventors: Ji-woong Park, Gwangju (KR); Ji-Yoon Jeong, Gwangju (KR); Su-Young Moon, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 0 days.

(21) Appl. No.: 14/144,206

(22) Filed: Dec. 30, 2013

(65) Prior Publication Data

US 2014/0312278 A1  Oct. 23, 2014

(30) Foreign Application Priority Data

Apr. 17, 2013 (KR) .................. 10-2013-0042194
Jun. 14, 2013 (KR) .................. 10-2013-0068456

(51) Int. Cl.
*C09K 5/16* (2006.01)
*C08K 5/42* (2006.01)
*C08K 5/16* (2006.01)
*C08K 9/10* (2006.01)

(52) U.S. Cl.
CPC .................. *C08K 5/42* (2013.01); *C08K 5/16* (2013.01); *C08K 9/10* (2013.01); *Y10T 428/2982* (2015.01)

(58) Field of Classification Search
None
See application file for complete search history.

(56) References Cited

U.S. PATENT DOCUMENTS

2005/0187102 A1* 8/2005 Tsurumi ............... B01J 13/18
                                                               503/201
2011/0045975 A1* 2/2011 Ehr ..................... A01N 25/28
                                                               504/105

OTHER PUBLICATIONS

Moon et al., Organic Sol-Gel Synthesis: Solution-Processable Microporous Organic Networks, Angew. Chem. Int. Ed. 2010 49, 9504-9508.*
Exception to Loss of Novelty published at the 111th General Meeting of the Korean Chemical Society on Apr. 17, 2013 (4 pages).

* cited by examiner

*Primary Examiner* — Jeffrey Washville
(74) *Attorney, Agent, or Firm* — Hauptman Ham, LLP

(57) ABSTRACT

Disclosed herein are a polymer nanocapsule and a preparing method thereof, and more particularly, a 3D covalent molecular network nanocapsule, and a preparing method thereof. According to the present invention, a nanocapsule having thermal stability and solvent resistance due to a 3D covalent molecular network structure may be easily prepared without performing an additional post-processing process such as addition of a cross-linking agent or catalyst or removal of a template or core. Since the nanocapsule formed as described above may support an organic dye, metal particles, and the like, it is expected that the nanocapsule will be variously applied to material storage and transport, drug delivery, and the like.

12 Claims, 19 Drawing Sheets

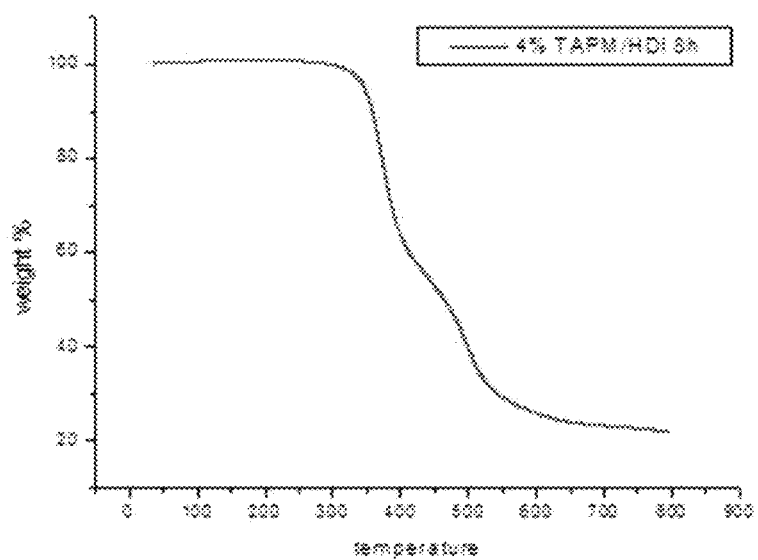

3D COVALENT MOLECULAR NETWORK NANOCAPSULE AND PREPARING METHOD THEREOF

CROSS-REFERENCE TO RELATED APPLICATION

This application claims priority to Korean Patent Application No. 10-2013-0042194 filed on Apr. 17, 2013 and Korean Patent Application No. 10-2013-0068456 filed on Jun. 14, 2013, and all the benefits accruing therefrom under 35 U.S.C. §119, the contents of which is incorporated by reference in its entirety.

BACKGROUND OF THE INVENTION

1. Technical Field

The present invention relates to a polymer nanocapsule and a preparing method thereof, and more particularly a 3D covalent molecular network nanocapsule, and a preparing method thereof.

2. Description of the Related Art

A polymer nanocapsule, which is a particle having a wall made of a polymer and a hollow internal space, may be used to support and release various materials. Since a nanocapsule may be applied to various fields such as a drug delivery system (DDS), an external skin preparation, a catalyst, a fiber, and the like, research into the nanocapsule has been widely conducted.

Generally, in order to prepare the polymer nanocapsule, various methods such as synthesis using a template, self-assembly of an amphiphilic polymer, emulsion synthesis, removal of a core using dendrimer, and the like, are used. However, since most of the nanocapsules are not chemically cross-linked, the nanocapsule may be easily deformed or decomposed by an environmental change. Therefore, in order to preserve an original structure of the polymer nanocapsule under various conditions, it is important that the nanocapsule has a cross-linked structure. In this case, for the cross-linked structure, addition of a cross-linking agent is required, and a post-processing process such as a removal process of a template and a catalyst or a core is required, such that an additional time and a complicated process should be required.

Describing an example of applying the nanocapsule in detail, in a drug delivery system (DDS), as an injection formulation for delivering a poorly water soluble drug, a contrast agent, or the like, into cells or in a body, there are polymer micelles formed through self-assembly of an amphiphilic block copolymer, a liposome made of a phospholipid bilayer, and the like. These materials have been widely studied as a formulation for delivering various physiological active drugs in the body.

However, in the case of the polymer micelle and liposome, since structures thereof are maintained by non-covalent bonds, the polymer micelle and liposome may be dissociated into monomers having a low molecular weight while being diluted in the body. As the polymer micelle and liposome become physically unstable as described above, a drug encapsulated therein is not sufficiently delivered, and it is difficult to effectively use the drug.

In the external skin preparation, as a method for stabilizing a useful active material, a method of using a polymer nanocapsule has been widely studied. However, it is impossible to completely stabilize the active material only by simply capturing the useful active material in the polymer particles. Particularly, when these particles are used in a formulation such as cosmetics, the polymer may be swelled by water, a surfactant, oil, or the like, in the formulation, such that there is a difficulty in that unstable active material is slowly discharged to the outside and deformed for a long period of time.

SUMMARY OF THE INVENTION

The present invention has been made in an effort to provide a new and easy synthesis method of a polymer nanocapsule. This method does not need addition of a cross-linking agent and catalyst. Also, the removal of a template and core are not required.

According to an exemplary embodiment of the present invention, there is provided a preparing method of a polyurea nanocapsule, the preparing method including: (a) polymerizing tetrakis(4-aminophenyl)methane and diisocyanate represented by the following Chemical Formula 13 in a solvent to obtain a polyurea sol; and (b) adding the polyurea sol to an aqueous solution to prepare a polyurea nanocapsule.

According to another exemplary embodiment of the present invention, there is provided a polyurea nanocapsule, wherein the polyurea is formed by polymerization of tetrakis(4-aminophenyl)methane and diisocyanate represented by the following Chemical Formula 1; the spherical polyurea nanocapsule has a radius of 30 to 400 nm; and the polyurea nanocapsule has a spherical shape in which the inside of the polyurea nanocapsule is empty:

 [Chemical Formula 13]

In Chemical Formula 13, n is a natural number of 2 to 20.

BRIEF DESCRIPTION OF THE DRAWINGS

The above and other objects, features and advantages of the present invention will be more clearly understood from the following detailed description taken in conjunction with the accompanying drawings, in which:

FIGS. 4A to 4C are photographs and a graph showing thermal stability of the nanocapsules prepared in Example 1;

DESCRIPTION OF THE PREFERRED EMBODIMENTS

Figure 1:
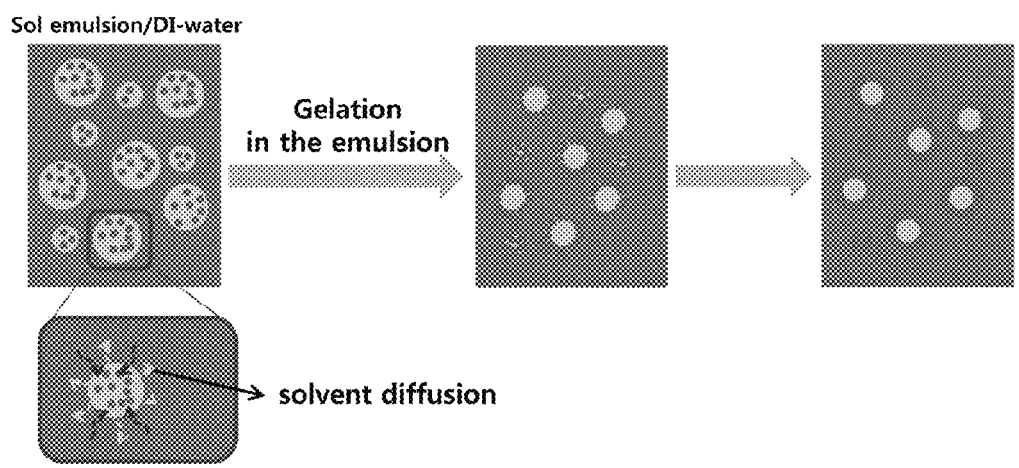
FIG. 1 schematically shows a formation mechanism of nanocapsules.

Hereinafter, various aspects and implementations of the present invention will be described in detail.

In one general aspect, the present invention relates to a preparing method of a polyurea nanocapsule including: (a) polymerizing an amine based compound and an isocyanate based compound in a solvent to obtain a polyurea sol solution; and (b) adding the polyurea sol solution to an aqueous solution to prepare a polyurea nanocapsule, wherein the amine based compound and the isocyanate based compound are selected from the following compounds.

① (At least three functional amine selected from triamine, tetramine, and a mixture thereof) and (diisocyanate), ② (diamine) and (at least three functional isocyanate selected from triisocyanate, tetraisocyanate, and a mixture thereof), ③ (at least three functional amine selected from triamine, tetraamine, and a mixture thereof) and (at least three functional isocyanate selected from triisocyanate, tetraisocyanate, and a mixture thereof), and ④ a mixture of at least two thereof.

In the preparing method of the present invention, since it was confirmed that in the case of dispersing the polyurea sol in another organic solvent other than water, the nanocapsule was not formed, it is important to disperse the polyurea sol in the aqueous solution to prepare the nanocapsule.

In an implementation, there is provided a preparing method of a polyurea nanocapsule characterized in that the amine based compound and the isocyanate based compound are selected from the following compounds.

(i) (tetramine represented by the following Chemical Formula 1) and (($C_2$-$C_{20}$) aliphatic isocyante based compound substituted with 2 to 4 isocyanate groups, ($C_6$-$C_{30}$) aromatic isocyante based compound substituted with 2 to 4 isocyanate groups, and a mixture of at least two thereof), (ii) (tetraisocyanate represented by the following Chemical Formula 2) and (($C_2$-$C_{20}$) aliphatic amine based compound substituted with 2 to 4 amino groups, ($C_6$-$C_{30}$) aromatic amine based compound substituted with 2 to 4 amino groups, and a mixture of at least two thereof), (iii) (tetramine represented by the following Chemical Formula 3) and (($C_2$-$C_{20}$) aliphatic isocyante based compound substituted with 2 to 4 isocyanate groups, ($C_6$-$C_{30}$) aromatic isocyante based compound substituted with 2 to 4 isocyanate groups, and a mixture of at least two thereof);

[Chemical Formula 1]

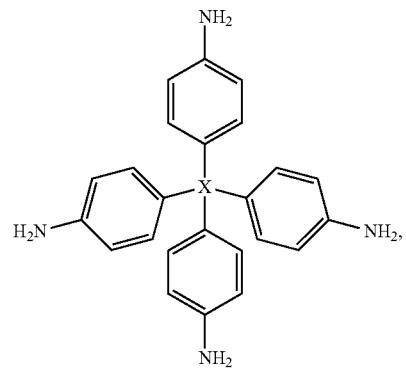

in Chemical Formula 1, X is a carbon or silicon atom,

[Chemical Formula 2]

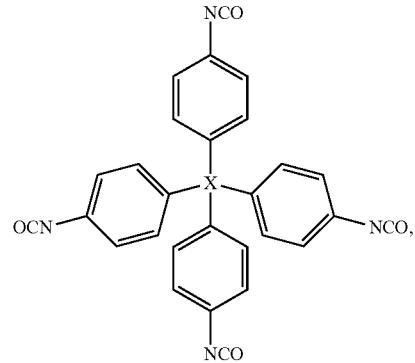

in Chemical Formula 2, X is a carbon or silicon atom.

[Chemical Formula 3]

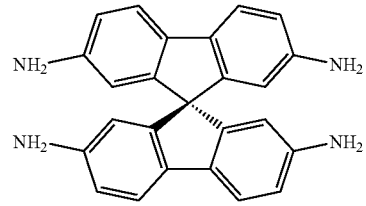

The compound of Chemical Formula 3 is 2,2',7,7'-tetramino-9,9'-spirobifluorene (TASBF).

In another implementation, there is provided a preparing method of a polyurea nanocapsule characterized in that the ($C_2$-$C_{20}$) aliphatic isocyanate based compound substituted with 2 isocyanate groups or ($C_2$-$C_{20}$) aliphatic amine based compound substituted with 2 amino groups is a compound represented by following Chemical Formula 4,

[Chemical Formula 4]

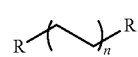

in Chemical Formula 4, all of the R(s) are the isocyanate group or amine group, and n is an integer of 1 to 10.

In another implementation, there is provided a preparing method of a polyurea nanocapsule characterized in that the ($C_6$-$C_{30}$) aromatic isocyanate based compound substituted with 2 to 4 isocyanate groups or ($C_6$-$C_{30}$) aromatic amine based compound substituted with 2 to 4 amino groups is any one selected from compounds represented by the following Chemical Formulas 5 to 11,

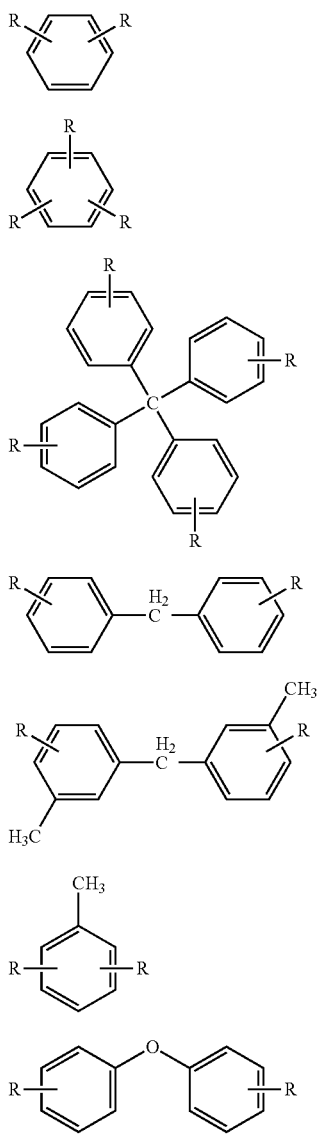

[Chemical Formula 5]

[Chemical Formula 6]

[Chemical Formula 7]

[Chemical Formula 8]

[Chemical Formula 9]

[Chemical Formula 10]

[Chemical Formula 11]

in Chemical Formulas 5 to 11, all of the R(s) are the isocyanate group or amino group.

Particularly, the mixed solutions for polymerization commonly contain a monomer having the amino group and a monomer having the isocyanate group so that urea may be formed through a polymerization reaction, and it is preferable that at least one of the monomer having the amino group and monomer having the isocyanate group is a monomer having a functional group at an end of a tetrahedral structure. It is preferable that amounts of mixed monomers may be stoichiometrically selected as a suitable molar ratio so that all of the amino groups and isocyanate groups present in the mixed solution may react each other. For example, in the case of mixing tetra(4-aminophenyl)methane and 1,4-diisocyanatobenzene, tetra(4-aminophenyl) methane and 1,4-diisocyanatobenzene may be mixed with each other at a molar ratio of 1:2, and in the case of mixing tetra(4-aminophenyl)methane and tetra(4-siocyanatophenyl) methane, tetra(4-aminophenyl)methane and tetra(4-siocyanatophenyl)methane may be mixed with each other at a molar ratio of 1:1.

In addition, at least three functional isocyanate is tetra(4-isocyanatophenyl)methane (TIPM); and the diisocyanate is selected from compounds represented by the following Chemical Formula 12:

OCN—Y—NCO     [Chemical Formula 12]

Y is phenylene or $[CH_2]_n$; and
N is a natural number of 2 to 20.

In another implementation, the present invention relates to a preparing method of a polyurea nanocapsule including: (a) polymerizing tetrakis(4-aminophenyl)methane and diisocyanate of Chemical Formula 12 in a solvent to prepare polyurea sol solution; and (b) adding the polyurea sol solution to an aqueous solution to prepare polyurea nanocapsule:

OCN—Y—NCO     [Chemical Formula 12]

Y is phenylene or $[CH_2]_n$; and
N is a natural number of 2 to 20. In another implementation, an example of the amine based compound capable of being used in the present invention includes 1,4-phenylenediamine (p-PDA), 1,3-phenylenediamine (m-PDA), trans-1,4-diaminocyclohexane (t-CHDA), hexamethylenediamine (NMDA), 1,4-diaminobutane (BDA), 1,8-diaminooctane (ODA), 1,12-diaminododecane (DDA), or the like, but is not limited thereto.

In another implementation, an example of the isocyanate based compound capable of being used in the present invention includes tetrakis(4-siocyanatophenyl)methane (TIPM), toluene 1,4-diisocyanate (TDI), 1,4-phenylene diisocyanate (p-PDI), 1,3-phenylene diisocyanate (m-PDI), 4,4'-methylenebis phenylisocyanate (4,4'-MDI), trans-1,4-cyclohexylene diisocyanate (t-CHDI), 1,4-diisocyanato butane (BDI), hexamethylene diisocyanate (HDI), 1,8-diisocyanato octane (ODI), 1,12-diisocyanato dodecane (DDI), or the like, but is not limited thereto.

There is provided a preparing method of a polyurea nanocapsule characterized in that among them, the diisocyanate compound is particularly hexamethylene diisocyanate or dodecylmethylene diisocyanate.

In another implementation, there is provided a preparing method of a polyurea nanocapsule characterized in that the solvent is at least one selected from dimethylformamide (DMF), dimethyl sulfoxide (DMSO), N-methyl-2-pyrrolidone (NMP), and dimethylacetamide (DMAC).

In another implementation, there is provided a preparing method of a polyurea nanocapsule characterized in that in step (a), a concentration of tetrakis(4-aminophenyl)methane/DMF solution is 7% (wt/vol) or less, preferably, 1 to 5% (wt/vol); and a concentration of diisocyanate/DMF solution is 7% (wt/vol) or less, preferably, 1 to 5% (weight/volume).

In another implementation, there is a preparing method of a polyurea nanocapsule characterized in that the aqueous solution is an aqueous solution containing a surfactant selected from sodium dodecyl sulfate (SDS), sodium dodecylbenzene sulfate (SDBS), cetyltrimethyl ammonium bromide (CTAB), ammonium lauryl sulfate (ALS), potassium lauryl sulfate, dioctyl sodium sulfosuccinate (DSS), dimethyl ether of tetradecylphosphonic, abietic acid, polyethoxylated octyl phenol, lauryl monoethanol, glycerol diester, diglyceride, sorbitan monoester, dodecyl betaine, n-dodecyl pyridinum chloride and a mixture of at least two thereof.

In another implementation, there is a preparing method of a nanocapsule characterized in that a concentration of the surfactant/aqueous solution is critical micelle concentration (CMC) or more, preferably, 0.1 to 1% (wt/vol).

It was confirmed that in the case of using the surfactant, nanocapsules having a more uniform size may be obtained, and particularly, in the case of using the surfactant within the above-mentioned concentration range, long-term (180 days) stability of the nanocapsule against the solvent may be newly achieved.

In another aspect, the present invention relates to a polyurea nanocapsule prepared according to various implementation of the present invention, and more particularly, to a polyurea nanocapsule having a 3D covalent molecular network structure.

In an implementation, the polyurea is formed by polymerization of tetrakis(4-aminophenyl)methane and diisocyanate represented by the following Chemical Formula 12; the spherical polyurea nanocapsule has a radius of 30 to 400 nm; and the polyurea nanocapsule has a spherical shape in which the inside of the polyurea nanocapsule is empty.

In an implementation, there is a polyurea nanocapsule characterized in that the diisocyanate is hexamethylene diisocyanate or dodecylmethylene diisocyanate.

In another general aspect, the present invention relates to a polyurea nanocapsule aggregate, which is a polyurea nanocapsule aggregate including a plurality of polyurea nanocapsules according to the implementations of the present invention, characterized in that the polyurea nanocapsules are dispersed in the polyurea nanocapsule aggregate so as to have an average radius of 30 to 400 nm.

The polyurea nanocapsule as described above has a significantly uniform radius distribution. It is impossible to achieve a uniform radius distribution of a polyurea nanocapsule at a certain degree without impairing an internal space of a polyurea nanocapsule according to the related art and an external spherical shape.

Particularly, when the aggregate of nanocapsules having a size of several ten to several hundred nm is prepared, it is impossible to separate only nanocapsules having the desired size, such that radius distribution of the nanocapsule in the prepared aggregate may be adjusted only by changing a preparing process, and it was confirmed that the above-mentioned radius distribution may be achieved only by the above-mentioned preparing method.

In another aspect, the present invention relates to a drug delivery system including the polyurea nanocapsule according to various implementations of the present invention.

In another aspect, the present invention relates to an external skin preparation containing the polyurea nanocapsule according to various implementations of the present invention.

According to the implementation of the present invention, a 3D covalent molecular network nanocapsule was synthesized by an organic sol-gel method. A cross-linked polyurea bond was obtained by synthesizing tetrakis(4-aminophenyl) methane (TAPM) having an amine group and diisocyanate using an organic sol-gel method, and this polyurea network configured a wall of a nanocapsule, such that a nanocapsule having a cross-linked structure may be synthesized without adding a cross-linking agent or a catalyst. In addition, the nanocapsule was formed by phase separation due to solvent diffusion in micro emulsion formed in an aqueous solution, such that the nanocapsule may be easily synthesized without removal of a template or core (FIG. 1).

Figure 2:
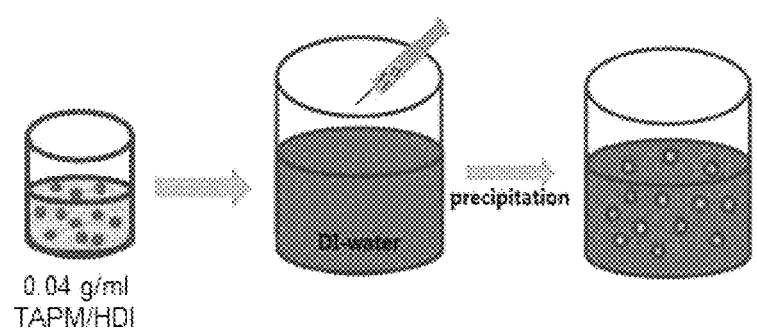
FIG. 2 schematically shows a preparing method of 3D covalent molecular network nanocapsules.
Figure 3A:
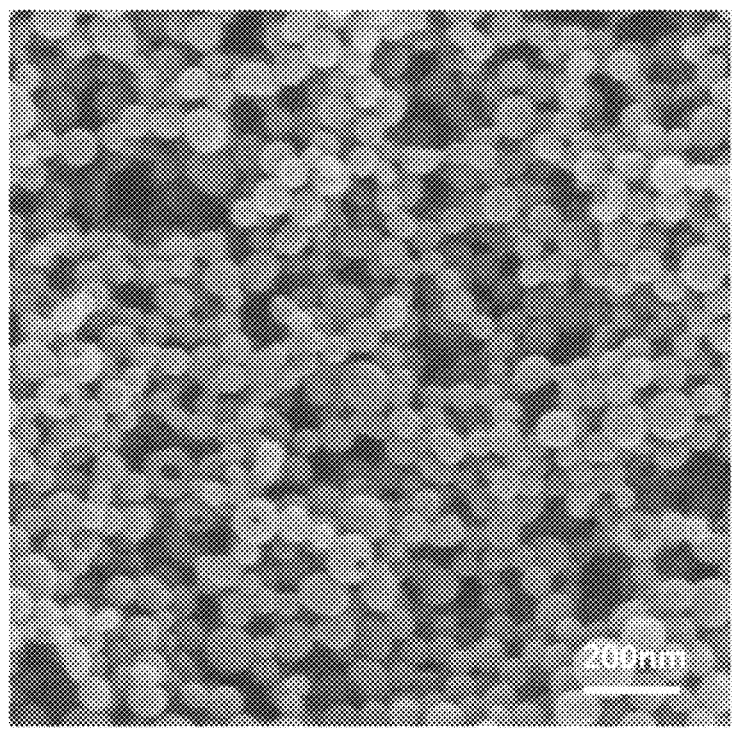
FIGS. 3A and 3B show morphology of nanocapsules prepared in Example 1.
Figure 3B:
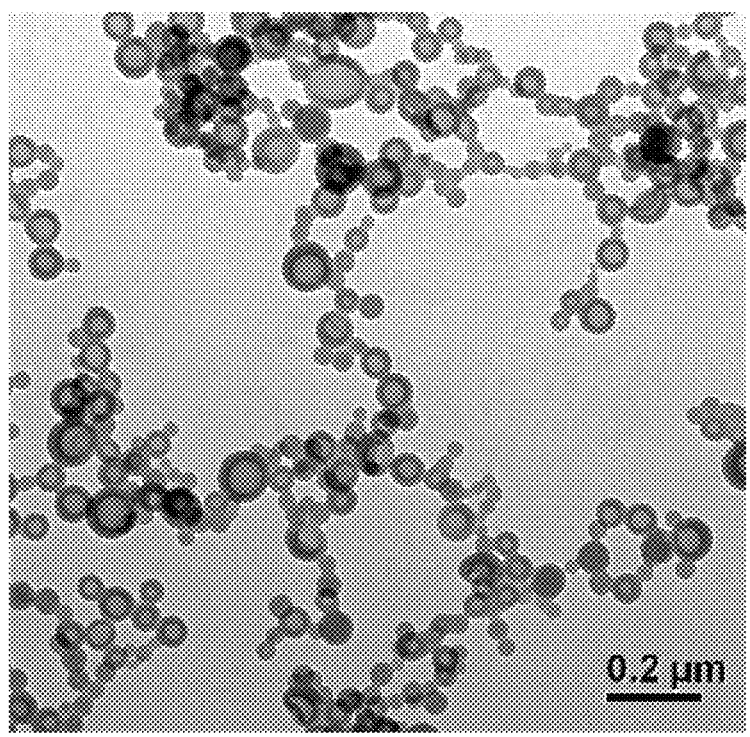

FIG. 2 is a view for describing shows a preparing method of a 3D covalent molecular network nanocapsule. FIG. 2 shows a process of forming a nanocapsule by synthesizing a sol having a concentration of 4% (wt/vol) from tetrakis (4-aminophenyl)methane (TAPM) and hexamethylene diisocyanate (HDI) using a DMF as a solvent, injecting the synthesized sol into an aqueous solution, and stirring the mixture. It may be confirmed through a scanning electron microscope (SEM) and transmission electron microscope (TEM) that the nanocapsule formed as described above has a shape in which a wall thereof is made of a polymer and the inside thereof is empty (FIG. 3).

Figure 4A:
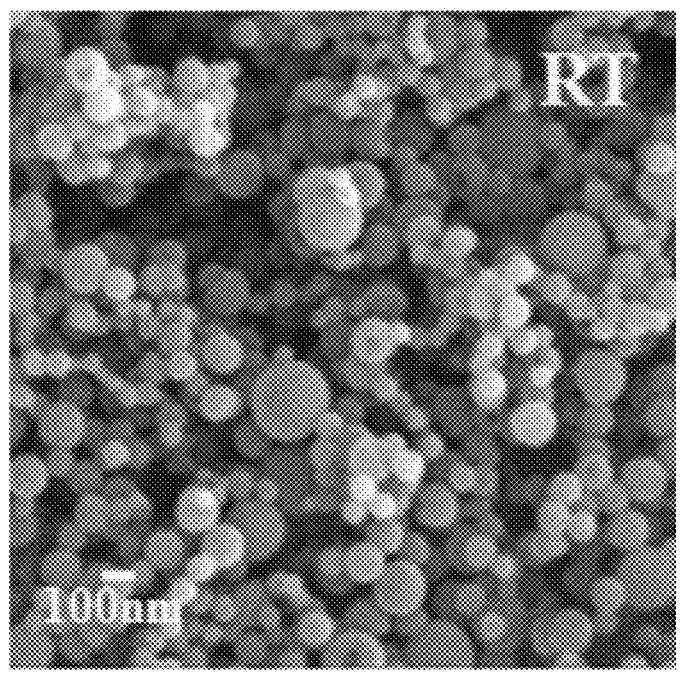
Figure 4B:
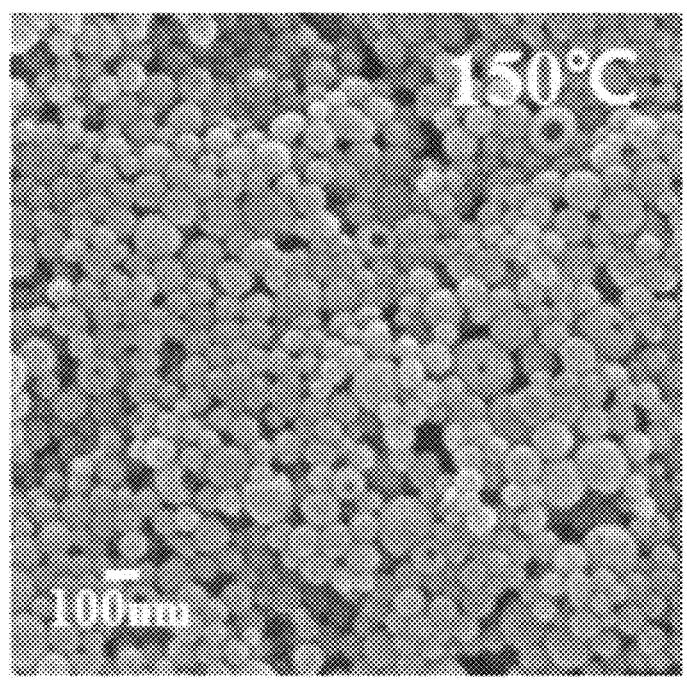

FIGS. 4A to 4C are SEM and thermogravimetric analysis (TGA) results for confirming thermal stability of the formed nanocapsule, and It may be confirmed that the wall of the nanocapsule had a 3D covalent molecular network structure, such that overall, the structure was properly maintained at a high temperature, and the nanocapsule was decomposed at about 330° C.

Figure 5A:
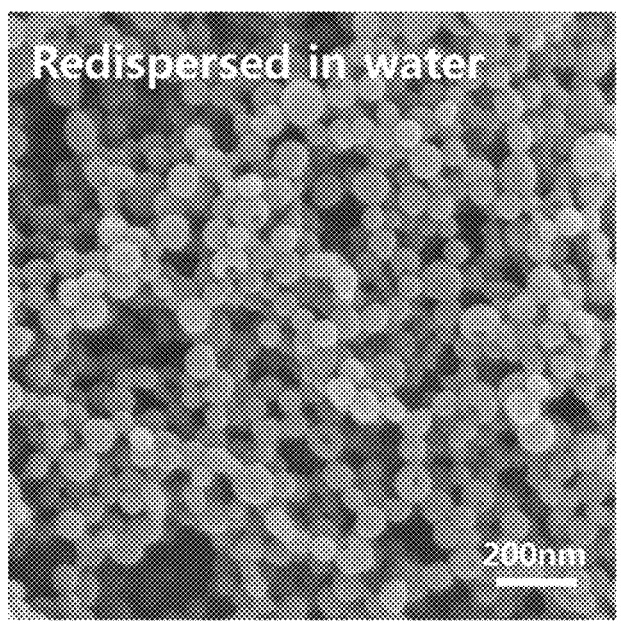
FIGS. 5A to 5C are photographs showing solvent resistance of the nanocapsules prepared in Example 1.
Figure 5B:
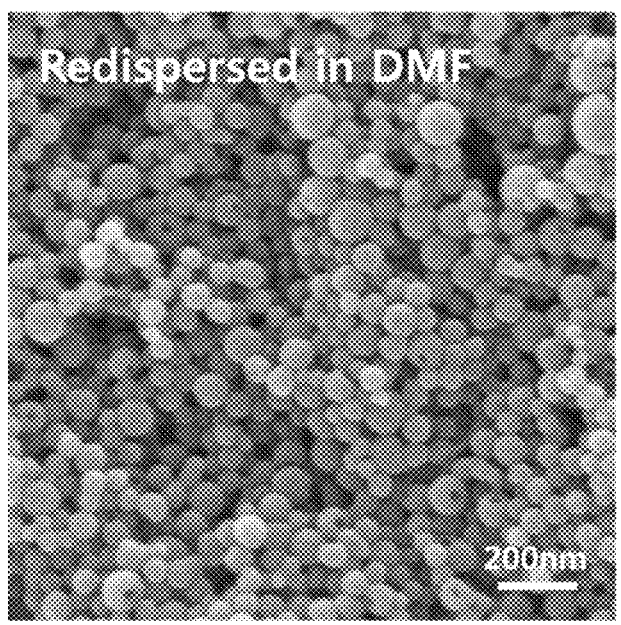
Figure 5C:
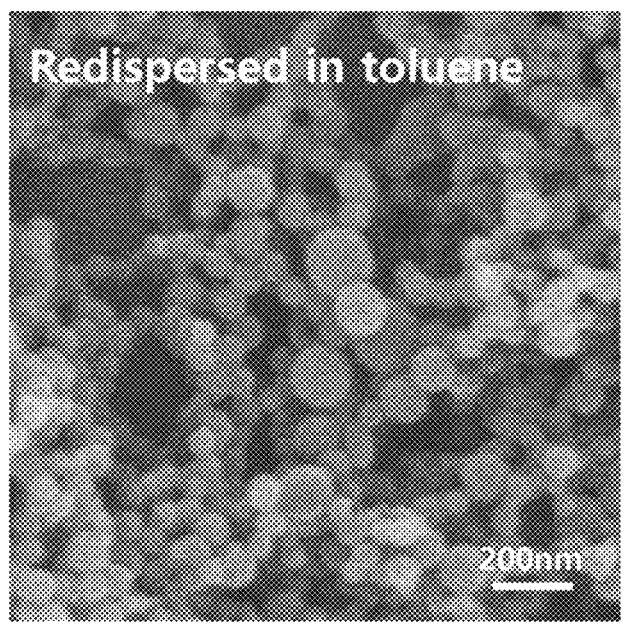

FIGS. 5A to 5C are images for confirming solvent resistance of the formed nanocapsule. The formed nanocapsule was re-dispersed in another solvent such as DMF, toluene, and as a result, it may be confirmed that overall, the structure was properly maintained before and after exchanging the solvent. The reason may be that the wall of the nanocapsule had the 3D covalent molecular network structure.

Figure 6:
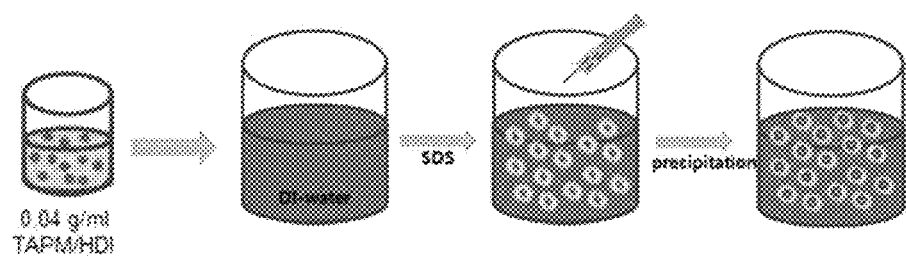
FIG. 6 schematically shows a preparing method of nanocapsules using a surfactant in Example 3.
Figure 7:
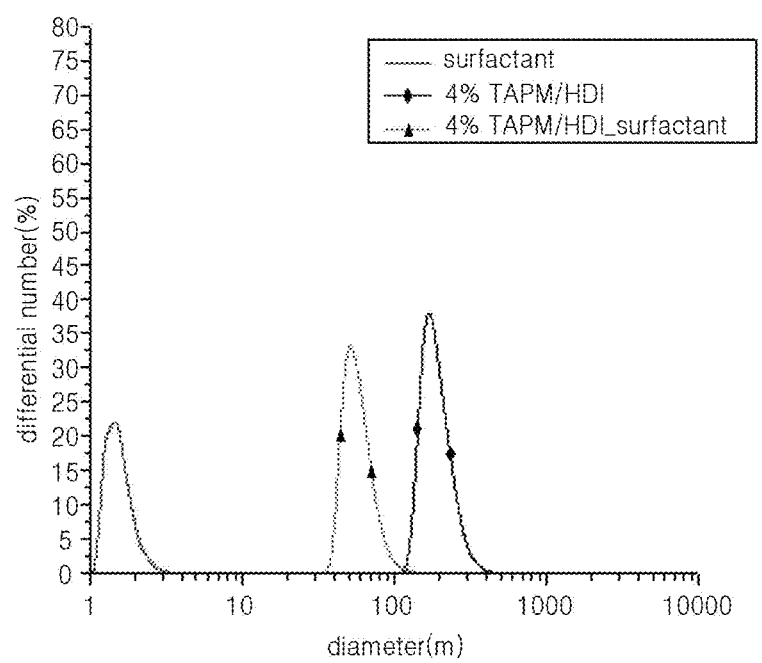
FIG. 7 is a graph showing size distribution of the nanocapsules prepared in Example 1, and the nanocapsules made with the surfactant and micelle of the surfactant in Example 3.
Figure 8A:
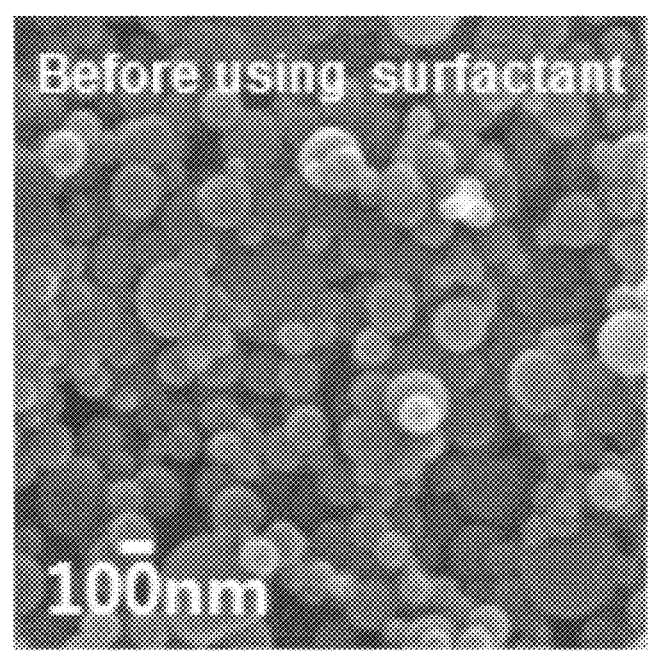
FIGS. 8A and 8B are photographs for comparing sizes of the nanocapsules prepared in Example 1 (not using the surfactant) and Example 3 (using the surfactant) with each other.
Figure 8B:
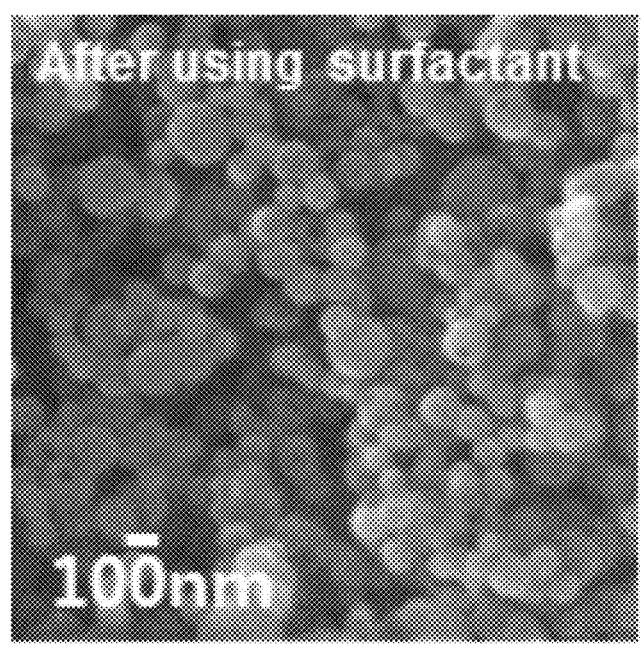
Figure 10:
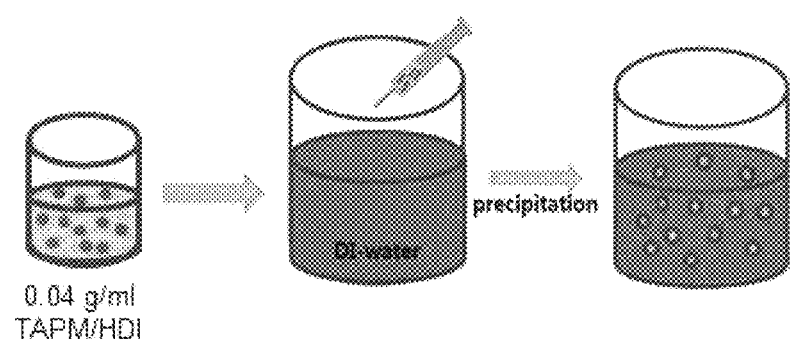
FIG. 10 schematically shows a preparing method of nanocapsules in which nile red corresponding to a fluorescent material is supported in Example 5.

FIG. 6 shows that a surfactant was introduced in order to prepare nanocapsules having a uniform size. The nanocapsule was formed by synthesizing a sol having a concentration of 4% (wt/vol) similarly to the case in FIG. 2, injecting the synthesized sol into an aqueous solution containing a surfactant dissolved therein, and then stirring the mixture. It may be confirmed through dynamic light scattering (DLS) and SEM that in the nanocapsule formed as described above, nanocapsules having a more uniform size was synthesized (FIGS. 7 and 8). FIG. 10 shows that nile red, which is a fluorescent material, is introduced in order to confirm whether or not a useful material may be supported on the nanocapsule. Similarly to the case in FIG. 2, nanocapsules were formed by synthesizing a sol having a concentration of 4%, mixing nile red with the sol, injecting the mixture into an aqueous solution, and then stirring them, and it was appreciated through an additional experiment that nile red was supported on the formed nanocapsule (FIG. 12).

Figure 12:
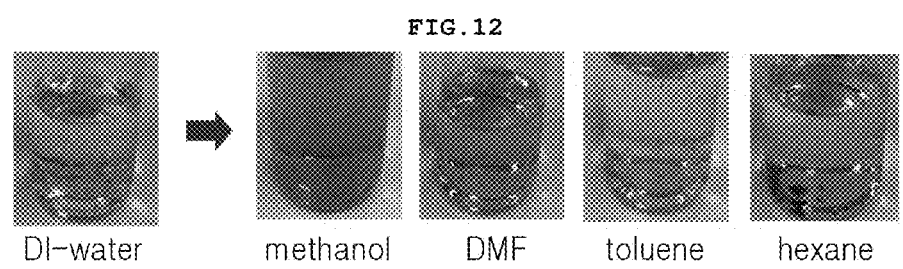
FIG. 12 is a photograph showing a change in colors of nanocapsules and the solvent in which the nanocapsules are contained according to the solvent in Experimental Examples.
Figure 13:
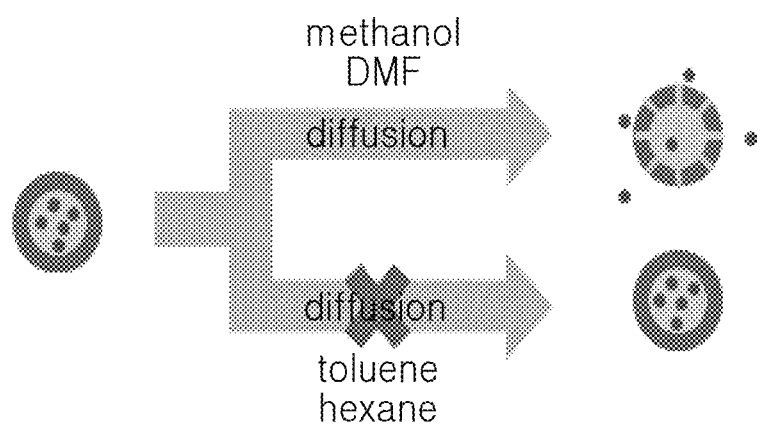
FIG. 13 shows whether or not nile red supported into the nanocapsules is diffused according to the solvent in Experimental Example.

FIG. 12 shows phenomena generated when the nanocapsule on which nile red was supported in DI-water was put into and stirred with methanol, DMF, toluene, and hexane in the additional experiment for confirm that nile red was supported. It may be confirmed that in the case of methanol and DMF, the supported nile red was discharged through pores of walls of nanocapsules having a network structure, such that a color of the solvent was changed to be red, and a color of the nanocapsule was changed to be white, and in the case of toluene and hexane, the supported nile red was not discharged through pores of wall of nanocapsules having a network structure, such that colors of the solvent and the nanocapsules were not changed (FIG. 13).

Hereinafter, the present invention will be described in detail through the Examples, or the like, but the scope and contents of the present invention are not reduced or limited by the Examples, or the like. In addition, it may appreciated that the present invention of which experiment results are not described may be easily carried out by a person with ordinary skilled in art based on the disclosure of the present invention including the following Example.

EXAMPLE

Preparation Example 1

Preparation of Polyurea Sol

An organic solution having a concentration of 4% (wt/vol) was prepared by dissolving tetra(4-aminophenyl)methane (0.279 mmol) in 2.5 mL of anhydrous N,N-dimethylforamide (DMF), and an organic solution having a concentration of 4% (wt/vol) was prepared by dissolving 1,6-diisocyanatohexane (0.558 mmol) in 2.5 mL of anhydrous DMF.

Figure 9:
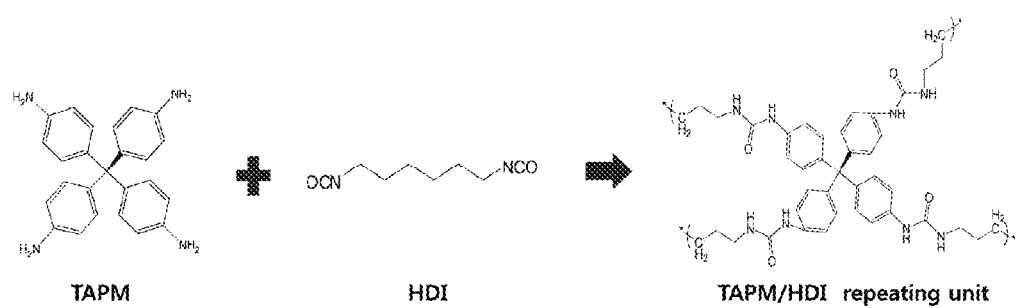
FIG. 9 shows Reaction Formula showing a process of preparing polyurea in Preparation Example 1, wherein a right side of an arrow indicates a repeating unit of prepared polyurea.

Thereafter, the tetra(4-aminophenyl)methane solution was slowly injected into and mixed with the 1,6-diisocyanatohexane solution. Polyurea sol having a concentration of 4% (wt/vol) was obtained by the reaction of the mixed solution at room temperature under nitrogen atmosphere for 8 hours (FIG. 9).

Preparation Example 2

Preparation of Polyurea Sol

Polyurea sol was prepared by the same method as in Preparation Example 1 except for using dodecylmethylene diisocyanate (DDI) instead of 1,6-diisocyanatohexane.

Examples 1 and 2

Preparation of Nanocapsule 1.5 ml of the Polyurea sols having the concentration of 4% (wt/vol) obtained in Preparation Examples 1 and 2 were slowly injected into DI-water (800 ml), respectively using a syringe. The mixture was stirred (450 rpm) at room temperature under air atmosphere for 1 hour, thereby obtaining a 3D covalent molecular network nanocapsule (FIG. 10).

Examples 3 and 4

Preparation of Nanocapsule

A 3D covalent molecular network nanocapsule was prepared by the same method as in Examples 1 and 2 except for using DI-water in which sodium dodecyl sulfate (SDS), which is a surfactant, was dissolved at a concentration of 0.626% (wt/vol) instead of pure DI-water.

Example 5

Supporting Fluorescent Material on Nanocapsule 0.024 g of nile red was mixed with 1.5 mL of the 4% polyurea sol prepared in Preparation Example 1 and injected into 800 mL of an aqueous solution, followed by stirring, thereby forming nanocapsules on which nile red was supported.

Figure 11:
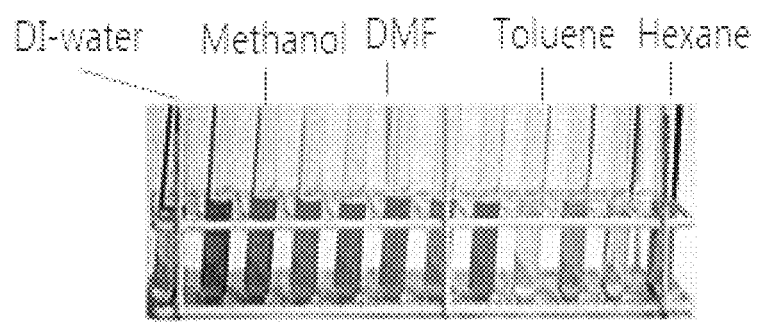
FIG. 11 shows a change in color of dissolved nile red according to the solvent.

As shown in FIG. 11, it may be confirmed that the nanocapsules on which nile red was not supported exhibited a white color, but the nanocapsules on which nile red was supported exhibited a purple color even by the naked eyes. For reference, since nile red, which is a compound having a structure of Chemical Formula 21, had a lipid soluble property, nile red was not dissolved in DI-water but dissolved in other organic solvent (methanol, DMF, toluene, and hexane) to thereby exhibit various colors.

[Chemical Formula 21]

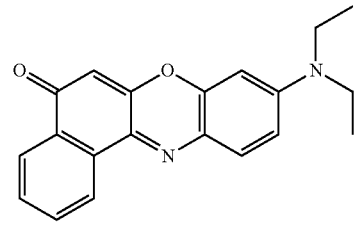

Experimental Example

Confirmation of Nile Red Supported on Nanocapsule

Whether or not nile red was supported on the nanocapsule prepared in Example 5 was confirmed as follows.

As described above, the nanocapsule on which nile red was supported exhibited a purple color, and it may be appreciated that colors of the nanocapsule on which purple nile red was supported and DI-water were not changed after injecting the nanocapsule on which purple nile red was supported into DI-water. It was confirmed that in the case of injecting the nanocapsule on which purple nile red was supported into toluene and hexane, colors of the nanocapsule on which purple nile red was supported and the organic solvent also were not changed. Meanwhile, it was confirmed that in the case of using methanol and DMF, the color of the organic solvent was changed to be red, but the color of the nanocapsule was changed to be white (FIG. 12).

This means that in the case of using DI-water, toluene, and hexane, the supported nile red did not pass through the pores of the wall of the nanocapsule having the 3D covalent molecular network structure, but in the case of using methanol and DMF, the supported nile red passed through the pores of the wall of the nanocapsule having the 3D covalent molecular network structure.

It may be confirmed through the above-mentioned phenomenon that nile red may be supported on the nanocapsule and the 3D covalent molecular network structure configuring the wall of the nanocapsule had selectivity for a solvent (FIG. 13).

As set forth above, according to the present invention, the nanocapsule having thermal stability and solvent resistance due to the 3D covalent molecular network structure may be easily prepared without performing an additional post-processing process such as addition of the cross-linking agent or catalyst or removal of the template or core. Since the nanocapsule formed as described above may support an organic dye, metal particles, and the like, it is expected that the nanocapsule will be variously applied to material storage and transport, drug delivery, and the like.

What is claimed is:
1. A preparing method of a polyurea nanocapsule, the preparing method comprising:
(a) polymerizing an amine based compound and an isocyanate based compound in a solvent to obtain a polyurea sol solution; and
(b) adding the polyurea sol solution to an aqueous solution to prepare a polyurea nanocapsule,
wherein the preparing method is performed below room temperature, the amine based compound and the isocyanate based compound are selected from the following compounds:

① (at least three functional amine selected from triamine, tetramine, and a mixture thereof) and (diisocyanate), ② (diamine) and (at least three functional isocyanate selected from triisocyanate, tetraisocyanate, and a mixture thereof), ③ (at least three functional amine selected from triamine, tetraamine, and a mixture thereof) and (at least three functional isocyanate selected from triisocyanate, tetraisocyanate, and a mixture thereof), ④ a mixture of at least two thereof, the solvent is selected from dimethylformamide (DMF), dimethyl sulfoxide (DMSO), N-methyl-2-pyrrolidone (NMP), dimethylacetamide(DMAC) or a mixture of at least two thereof, and the aqueous solution is an aqueous solution containing a surfactant selected from sodium dodecyl sulfate (SDS), sodium dodecylbenzene sulfate (SDBS), cetyltrimethyl ammonium bromide (CTAB), ammonium lauryl sulfate (ALS), potassium lauryl sulfate, dioctyl sodium sulfosuccinate (DSS), dimethyl ether of tetradecylphosphonic, abietic acid, polyethoxylated octyl phenol, lauryl monoethanol, glycerol diester, diglyceride, sorbitan monoester, dodecyl betaine, n-dodecyl pyridinum chloride or a mixture of at least two thereof.

2. The preparing method of claim 1, wherein the amine based compound and the isocyanate based compound are selected from the following compounds:

(i) (tetramine represented by the following Chemical Formula 1) and (($C_2$-$C_{20}$) aliphatic isocyante based compound substituted with 2 to 4 isocyanate groups, ($C_6$-$C_{30}$) aromatic isocyante based compound substituted with 2 to 4 isocyanate groups, and a mixture of at least two thereof), (ii) (tetraisocyanate represented by the following Chemical Formula 2) and (($C_2$-$C_{20}$) aliphatic amine based compound substituted with 2 to 4 amino groups, ($C_6$-$C_{30}$) aromatic amine based compound substituted with 2 to 4 amino groups, and a mixture of at least two thereof), (iii) (tetramine represented by the following Chemical Formula 3) and (($C_2$-$C_{20}$) aliphatic isocyante based compound substituted with 2 to 4 isocyanate groups, (($C_6$-$C_{30}$) aromatic isocyante based compound substituted with 2 to 4 isocyanate groups, and a mixture of at least two thereof);

[Chemical Formula 1]

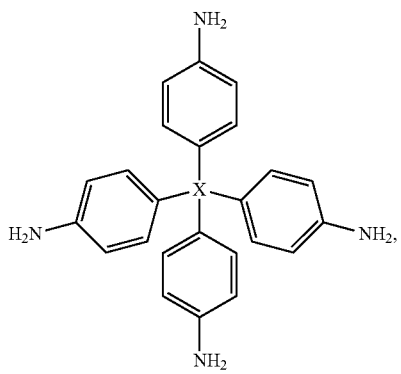

where, X is a carbon or silicon atom,

[Chemical Formula 2]

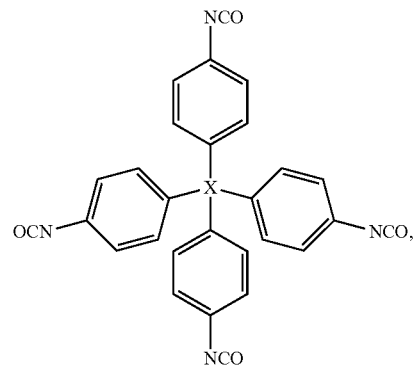

in Chemical Formula 2, X is a carbon or silicon atom, and

[Chemical Formula 3]

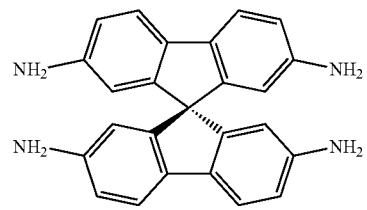

the compound of Chemical Formula 3 is 2,2',7,7'-tetraamino-9,9'-spirobifluorene (TASBF).

3. The preparing method of claim 2, wherein the ($C_2$-$C_{20}$) aliphatic isocyanate based compound substituted with 2 isocyanate groups or ($C_2$-$C_{20}$) aliphatic amine based compound substituted with 2 amino groups is a compound represented by following Chemical Formula 4,

[Chemical Formula 4]

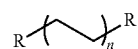

where, all of the R(s) are the isocyanate group or amine group, and n is an integer of 1 to 10; and the ($C_6$-$C_{30}$) aromatic isocyanate based compound substituted with 2 to 4 isocyanate groups or ($C_6$-$C_{30}$) aromatic amine based compound substituted with 2 to 4 amino groups is any one selected from compounds represented by the following Chemical Formulas 5 to 11,

[Chemical Formula 5]

[Chemical Formula 6]

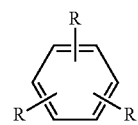

[Chemical Formula 7]

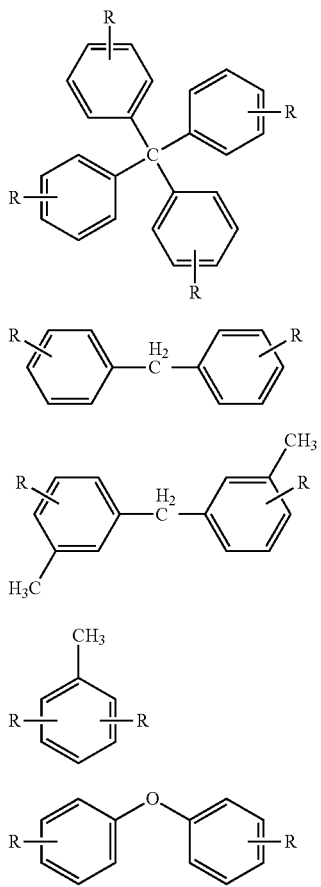

[Chemical Formula 8]

[Chemical Formula 9]

[Chemical Formula 10]

[Chemical Formula 11]

where, all of the R(s) are the isocyanate group or amino group.

4. The preparing method of claim 1, wherein at least three functional amine is tetrakis(4-aminophenyl)methane (TAPM) or 2,2'7,7'-tetraamino-9,9'-spirobifluorene (TASBF);
the diamine is selected from phenylenediamine (PDA), oxyphenylenediamine (ODA), trans-1,4-diaminocyclohexane (t-CHDA), hexamethylenediamine (HMDA), and a mixture of at least two thereof;
at least three functional isocyanate is tetra(4-isocyanatophenyl)methane (TIPM); and
the diisocyanate is selected from compounds represented by the following Chemical Formula 12:

OCN—Y—NCO        [Chemical Formula 12]

where, Y is phenylene or $[CH_2]_n$; and
n is a natural number of 2 to 20.

5. The preparing method of claim 1, wherein the amine based compound is tetrakis(4-aminophenyl)methane; and
the isocyanate based compound is a diisocyanate represented by the following Chemical Formula 13:

OCN—$[CH_2]_n$—NCO        [Chemical Formula 13]

where, n is a natural number of 2 to 20.

6. The preparing method of claim 4, wherein the diisocyanate is selected from toluene diisocyanate (TDI), p-phenylene diisocyanate (p-PDI), m-phenyl diisocyanate (m-PDI), 4,4'-methylenediphenyl diisocyanate (4,4'-MDI), 1,4-cyclohexane diisocyanate (t-CHDI), 1,4-butane diisocyanate (BDI), 1,6-hexamethylene diisocyanate (HDI), 4,4'-diphenylene ether diisocyanate (ODI), dodecylmethylene diisocyanate (DDI), and a mixture of at least two thereof.

7. The preparing method of claim 1, wherein in step (a), a concentration of the amine based compound/DMF solution is 7% (wt/vol) or less; and
a concentration of the isocyanate based compound /DMF solution is 7% (wt/vol) or less.

8. The preparing method of claim 1, wherein a concentration of the surfactant/aqueous solution is a critical micelle concentration (CMC) or more.

9. A polyurea nanocapsule prepared according to claim 1.

10. A polyurea nanocapsule of claim 9, wherein the polyurea nanocapsule has a 3D covalent molecular network structure.

11. A polyurea nanocapsule of claim 9, a fluorescent material supported on the polyurea nanocapsule.

12. A polyurea nanocapsule aggregate including a plurality of polyurea nanocapsules according to claim 9, wherein the polyurea nanocapsules are dispersed in the polyurea nanocapsule aggregate so as to have a radius of 30 to 400 nm.

* * * * *